US008342577B2

(12) United States Patent
Schoenoff et al.

(10) Patent No.: US 8,342,577 B2
(45) Date of Patent: Jan. 1, 2013

(54) MAGNETIC QUICK DISCONNECT FITTING

(75) Inventors: Michael Schoenoff, Rochester, MN (US); Mark McMasters, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 472 days.

(21) Appl. No.: 11/950,594

(22) Filed: Dec. 5, 2007

(65) Prior Publication Data

US 2009/0146412 A1 Jun. 11, 2009

(51) Int. Cl.
*F16L 25/00* (2006.01)

(52) U.S. Cl. .............. 285/9.1; 285/1; 285/374

(58) Field of Classification Search .......... 62/49.1, 62/49.2; 141/83; 222/77; 137/101.31, 403, 137/406, 407, 408, 909; 177/128, 145, DIG. 5; 73/DIG. 4; 55/DIG. 6; 439/38, 39, 40; 285/1, 285/9.1, 133.21, 318, 918, 374
See application file for complete search history.

(56) References Cited

U.S. PATENT DOCUMENTS

| | | | | |
|---|---|---|---|---|
| 3,061,321 A * | 10/1962 | Smith | .......... | 277/637 |
| 3,181,895 A * | 5/1965 | Cator | .......... | 285/1 |
| 3,586,048 A * | 6/1971 | Arnold | .......... | 137/614.04 |
| RE32,451 E * | 7/1987 | Proctor et al. | .......... | 62/149 |
| 4,807,676 A * | 2/1989 | Cerny et al. | .......... | 435/6 |
| 5,477,896 A * | 12/1995 | Grifols Lucas | .......... | 141/83 |
| 6,667,444 B1 * | 12/2003 | Armitage | .......... | 177/168 |

* cited by examiner

*Primary Examiner* — James Hewitt
*Assistant Examiner* — Jay R Ripley
(74) *Attorney, Agent, or Firm* — Baker & Hostetler LLP

(57) ABSTRACT

A fitting for releasably coupling two structures and for maintaining fluid communication between the two structures has a first and second fitting member. The first fitting member includes a first ferromagnetic coupling element, and the second fitting member includes a second ferromagnetic coupling element. The first and second fitting members are constructed and arranged so as to be moved into engaged relation with one another and to be moved apart from on another so as to be separate from one another. Magnetic attraction between the first and second fitting members maintains the fitting members in engagement, and the fitting members are decoupled by applying force sufficient to overcome the magnetic attraction.

15 Claims, 5 Drawing Sheets

MAGNETIC QUICK DISCONNECT FITTING

FIELD OF THE INVENTION

The disclosure relates generally to couplers. More particularly, the disclosure relates to magnetic couplers for fluid transfer.

BACKGROUND OF THE INVENTION

Many applications require fluids to be moved from one structure to another. A liquid or a gas, for example, may be transferred from a storage container to the interior of a machine, or from the interior of a machine to a storage container. In certain applications, fluids may be required to be transferred without leakage to avoid loss of the fluid into the atmosphere and to reduce the introduction of impurities into the contained fluid. Couplers are often used to facilitate this fluid transfer.

SUMMARY OF THE INVENTION

At least one embodiment of the invention improves upon currently-available fittings by presenting a fitting which allows a first fluid chamber to be connected in fluid communication with a second fluid chamber and which allows the first fluid chamber to be disconnected from the second fluid chamber. The fitting comprises a first fitting means for mounting in fluid communication with the first fluid chamber. The first fitting means includes a first magnetic coupling element. The fitting also comprises a second fitting means for mounting in fluid communication with the fluid reservoir. The second fitting means includes a second magnetic coupling element. The first and second fitting means are constructed and arranged to be moved into engaged relation with one another such that when the first and second fitting means are engaged with one another, magnetic attraction between the first and second magnetic coupling elements thereof holds the fitting means in engagement, and such that movement of the first and second fitting means into engaged relation establishes fluid communication between the fluid chamber and the fluid reservoir. The first and second fitting means are constructed and arranged to be moved apart from one another so that they are separate from one another, such that the force required to separate the first and second fitting means is limited to the force required to overcome the magnetic attraction between the first and second fitting means.

In some embodiments of the invention, a load limiting fitting for releasably coupling a fluid reservoir on a load cell so that the fluid reservoir is in fluid communication with a fluid chamber is provided. The fitting comprises a first fitting member configured to be mounted with respect to the load cell and in fluid communication with the fluid chamber. The first fitting member includes a first magnetic coupling element. A second fitting member configured to be mounted with respect to the fluid reservoir and in fluid communication with the fluid reservoir. The second fitting member includes a second magnetic coupling element. The first and second fitting members are constructed and arranged to be moved into engaged relation with one another, and to be moved apart from one another, so that they are separate from one another. The first and second fitting members are further constructed and arranged such that when the first and second fitting members are engaged with one another, magnetic attraction between the first and second magnetic coupling elements thereof holds the fitting members in engagement, and such that when the fitting members are moved apart from one another, force is applied to the fitting members sufficient to overcome the magnetic attraction. The first and second fitting members are further constructed and arranged such that when the fitting members are mounted with respect to the load cell and the fluid reservoir, respectively, movement of the fitting members into engaged relation establishes fluid communication between the fluid chamber and the fluid reservoir and releasably couples the fluid reservoir to the load cell so that fluid in the fluid reservoir can be weighed by the load cell. The fluid reservoir can be removed from the load cell by moving the fitting members apart such that the force required to move the fitting members apart is less than a limit load of the load cell.

In some embodiments of the invention, a method for coupling and decoupling a fluid reservoir on a load cell in a manner which limits the load transferred to the load cell comprises providing a first fitting member mounted in fluid communication with a fluid chamber, the first fitting member having a first magnetic coupling element; providing a second fitting member mounted in fluid communication with a fluid reservoir, the second fitting member having a second magnetic coupling element; engaging the first and second fitting members with one another to establish fluid communication between the fluid chamber and the fluid reservoir and holding the first and second fitting members in engaged relation with one another with the magnetic force of attraction between the first and second magnetic coupling elements; and separating the first and second fitting members so that the fluid chamber and the fluid reservoir are no longer in fluid communication said separating comprising applying a force to the first and second fitting members that is limited to the force required to overcome the magnetic attraction between the first and second fitting members.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
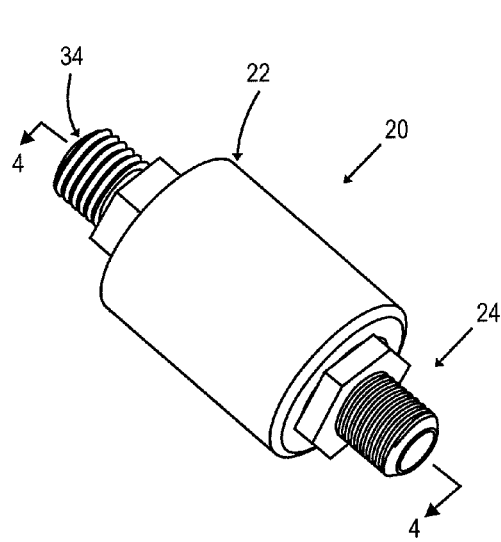
FIG. 1 is a perspective view an example of a fitting constructed according to an embodiment of the invention showing a first fitting member and second fitting member engaged.

The invention will now be described with reference to the drawing figures, in which like numerals refer to like parts throughout. FIG. 1 shows an example of a fluid conducting fitting 20 which allows a first fluid chamber 26 (shown in FIG. 5) to be connected in fluid communication with a second fluid chamber 28 (shown in FIGS. 5-7) and allows the first fluid chamber 26 to be disconnected from the second fluid chamber 28. The fitting 20 comprises a first fitting member 22 which may be mounted in fluid communication with a first fluid chamber 26. The first fitting member 22 includes a first magnetic coupling element 30 (shown in FIG. 2). The fitting 20 also comprises a second fitting member 24 for mounting in fluid communication with the second fluid chamber 28. The second fitting member 24 includes a second magnetic coupling element 32.

The first and second fitting members 22, 24 are constructed and arranged to be moved into engaged relation with one another such that when the first and second fitting members 22, 24 are engaged with one another, magnetic attraction between the first and second magnetic coupling elements 30, 32 thereof holds the fitting members 22, 24 in engagement and such that movement of the fitting members 22, 24 into engaged relation establishes fluid communication between the first fluid chamber 26 and the second fluid chamber 28. It can be understood that the first magnetic coupling element 30 may be disposed on the first fitting member 22, or that the first magnetic coupling element 30 may be arranged on the second fitting member 24. Similarly, it can be understood that the position of the second magnetic coupling element 32 may also be switched such that the second magnetic coupling element 32 is disposed on the first fitting member 22 instead of the second fitting member 24. The first and second fitting members 22, 24 also are constructed and arranged to be moved apart from one another so that they are separate from one another. The force required to separate the first and second fitting members 22, 24 may be limited to the force required to overcome the magnetic attraction between the first and second fitting members 22, 24.

Details of the structure and operation of the example embodiment of fitting 20 is illustrated in several of the figures. FIG. 1 shows one example of the fitting 20 having a generally cylindrical shape and including a through passage 34 configured for fluid flow. Each fitting member 22, 24 may be configured with a threaded end portion 36, 38 adapted to connect, respectively, to first and second fluid chambers 26, 28. Each fluid chamber may be any type of container or other structure constructed to store or hold a fluid (liquid or gas), any type of structure constructed to move a fluid (e.g., piping, tubing) or any other type of structure which may contain or transmit a fluid (e.g., the interior of a machine). The fitting members 22, 24 are an example of a fitting means for mounting in fluid communication with the first and second fluid chambers 26, 28. When the first fitting member 22 is connected to the first fluid chamber 26 and the second fitting member 24 is connected to the second fluid chamber 28 whether directly or indirectly via interconnections, and the first and second fitting members 22, 24 are interengaged, the first and second fluid chambers 26, 28 are in fluid communication with one another. When the first and second fitting members 22, 24 are separated from each other, the first and second fluid chambers 26, 28 are no longer in fluid communication.

Figure 2:
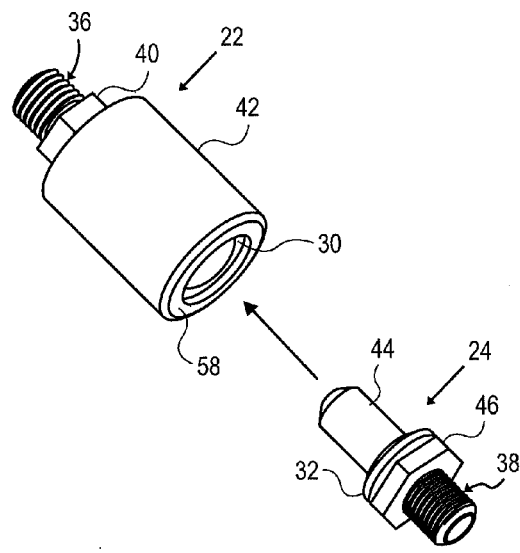
FIG. 2 perspective view of the fitting shown in FIG. 1 showing a first fitting member in exploded relation to a second fitting member.

FIG. 2 shows the fitting members 22, 24 separated from one another. Fitting member 22 includes a nut structure 40 configured to receive a hand tool (e.g., a wrench) for installing and removing the fitting member 22. Fitting member 22 also includes the threaded end portion 36, a cap structure 42, and the first magnetic coupling element 30. The first magnetic coupling element 30 is mounted within the cap structure 42. The second fitting member 24 includes a body portion 44, a nut structure 46 configured to receive a hand tool for installing and removing the fitting member 24, the threaded end portion 38, and the second magnetic coupling element 32. The second magnetic coupling element 32 is arranged along the body portion 44.

Figure 3:
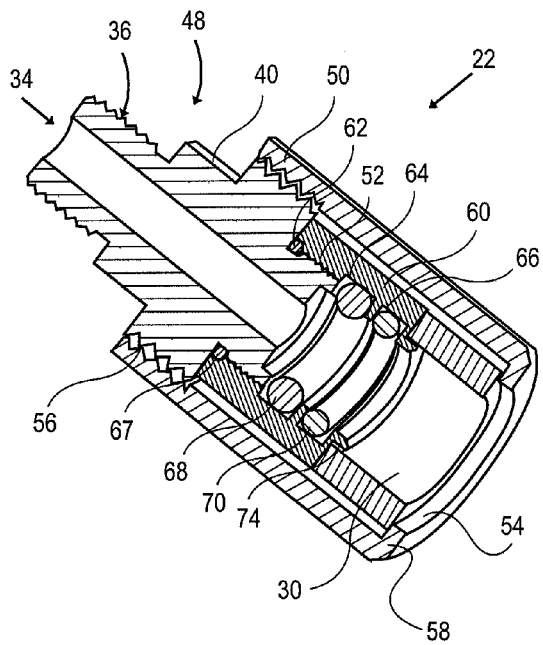
FIG. 3 is a cross sectional view of the fitting of FIG. 1 taken through the line 4-4 showing first and second fitting members of the fitting separated from one another.
Figure 3:
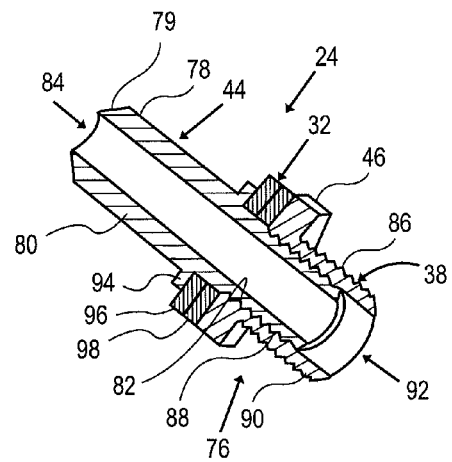

As can be understood from FIG. 3, the first fitting member 22 includes a base structure 48 which is mounted on the cap structure 42. The base structure 48 is an integral structure which may be constructed of a metallic material. The base structure 48 includes the threaded portion 36 and the nut structure 40. The base structure 48 further includes threaded portions 50 and 52. The through passage 34 extends through the base structure 48. An annular recess 54 is disposed at one end of passage 34.

The cap structure 42 is a generally hollow cylindrical structure. The cap structure 42 is an integral structure constructed to include internal threading 56 at one end and a ring-shaped lip 58 at another end. The base structure 48 is secured to the cap structure 42 by the threaded engagement of threaded portions 50, 56 on the base structure 48 and cap structure 42, respectively.

A housing structure 60 is disposed within the first fitting member 22. The housing structure 60 in the example fitting member 22 is generally a hollow cylindrical structure. The housing structure 60 may be an integral structure constructed to provide internal threading 62 and a pair of grooves 64, 66. The housing structure 60 is secured to the base structure 48 by threaded engagement between respective threaded portions 52, 62 on the housing structure 60 and base structure 48, respectively. The base structure 48, the cap structure 42 and the housing structure 60 may be metallic structures formed of brass, but each may be formed of any other suitable material, such as any suitable metallic material or any suitable plastic or composite material. The metallic material may be non-magnetic, but this is not required.

A pair of O-ring seal structures 68, 70 are disposed in the grooves 64, 66 of the housing structure 60 for maintaining a seal against fluid leaks between the housing structure 60 of the first fitting member 22 and the second fitting member 24. Seal structure 67 holds a seal between the housing structure and the base structure 48 of the first fitting member 22. Each seal structure 67, 68, 70 may be a generally annular structure. Each seal structure 67, 68, 70 may be constructed of an elastomeric material. The elastomeric material may be rubber, a thermoplastic, or any other suitable elastomer may be used. The seal structure 67, 68, 70 may have a circular cross-section (or O-shaped cross section), a square cut cross-section, a W-shaped cross-section, an X-shaped cross-section, or any other suitable cross-section profile. It can also be understood that other embodiments of a fitting are contemplated and within the scope of the invention in which seal structures 67, 68, 70 are not required. The first fitting member 22 could be constructed, for example, in other embodiments of the invention as an O-ring-less structure.

The first magnetic coupling element 30 is a generally annular structure and is disposed within the first fitting member 22 between the housing structure 60 and the ring shaped lip 58 on the cap structure 42. The housing structure 60 is shaped to form an annular wall 74 which extends partially within the first magnetic coupling element 30. The first magnetic coupling component 30 is preferably a permanent magnet formed of ferromagnetic material such as neodymium. In the example embodiment, the first magnetic coupling element 30 is disposed within the first fitting member 22. However, the first magnetic coupling element 30 does not have to be disposed within the first fitting member 22. The first magnetic coupling element 30 may, for example, be arranged along the ring-shaped lip 58 on an outer surface of the first fitting member 22.

The second fitting member 24 includes a body structure 44 and a body holding structure 76. The body structure 44 may be an integral structure shaped to form a tip portion 78 with a beveled surface 79, a ring shaped wall structure 80 and an externally threaded end portion 82. The beveled surface 79 is not required. The tip portion 78 may be configured with a flat surface, or any other suitable geometry. A passage 84 extends through the body structure 44 for conducting fluid. The body holding structure 76 may be an integral structure shaped to form a ring shaped wall structure 86, internally and externally threaded portions 88 and 90, respectively, and a through passage 92. The body structure 44 and the body holding structure 76 may be metallic structures formed of brass, but each may be formed of any other suitable material, such as any suitable metallic material or any suitable plastic or composite material. The metallic material may be non-magnetic, but this is not required. The body structure 44 is secured to the body holding structure 76 by threaded engagement between the threaded portions 82, 88 on the respective structures.

The second magnetic coupling element 32 is mounted about the body structure 44 and is held on the second fitting member by flange 94 of the body structure 44 and nut structure 46 of the body holding structure 76. The second magnetic coupling element 32 may be comprised of one or more generally ring shaped structures, or annular plates 96, 98. The plates 96, 98 may be steel or any other suitable ferromagnetic material. In the example embodiment, two steel plates are used. It can be understood that the first magnetic coupling element 30 may be disposed on the first fitting member 22, or that the first magnetic coupling element 30 may be arranged on the second fitting member 24. Similarly, it can be understood that the position of the second magnetic coupling element 32 may also be switched such that the second magnetic coupling element 32 is disposed on the first fitting member 22 instead of the second fitting member 24.

The first and second fitting members 22, 24 are constructed and arranged to be moved into engaged relation with one another (FIG. 4, for example), and to be moved apart from one another so that they are separate from one another (FIG. 3, for example). When the first and second fitting members 22, 24 are in engaged relation with one another as shown, for example, in FIG. 4, the body structure 44 of the second fitting member 24 is housed within the housing structure 60 of the first fitting member 22 such that the tip portion 78 engages seal structures 68, 70 to provide a fluid tight seal. Magnetic attraction between the first and second magnetic coupling elements 30, 32 holds the first and second fitting members 22, 24 in engagement. As can be appreciated from FIG. 4, the magnetic attraction between the first and second magnetic coupling elements 30, 32 applies a magnetic force on each of the fitting members 22, 24 which force tends to move the fitting members 22, 24 toward one another. When the fitting members 22, 24 are interengaged, the second magnetic coupling element 32 is disposed within the recess 54 of the first fitting member 22 such that the first magnetic coupling element 30 contacts the second magnetic coupling element 32. The through passage 34 of the first fitting member 22 aligns with the through passage 84 of the body structure 44 and the through passage 92 of the body holding structure 76 of the second fitting member 24 to establish fluid communication between the first fitting member 22 and the second fitting member 24, and thus establish fluid communication between the first fluid chamber 26 and the second fluid chamber 28.

Figure 4:
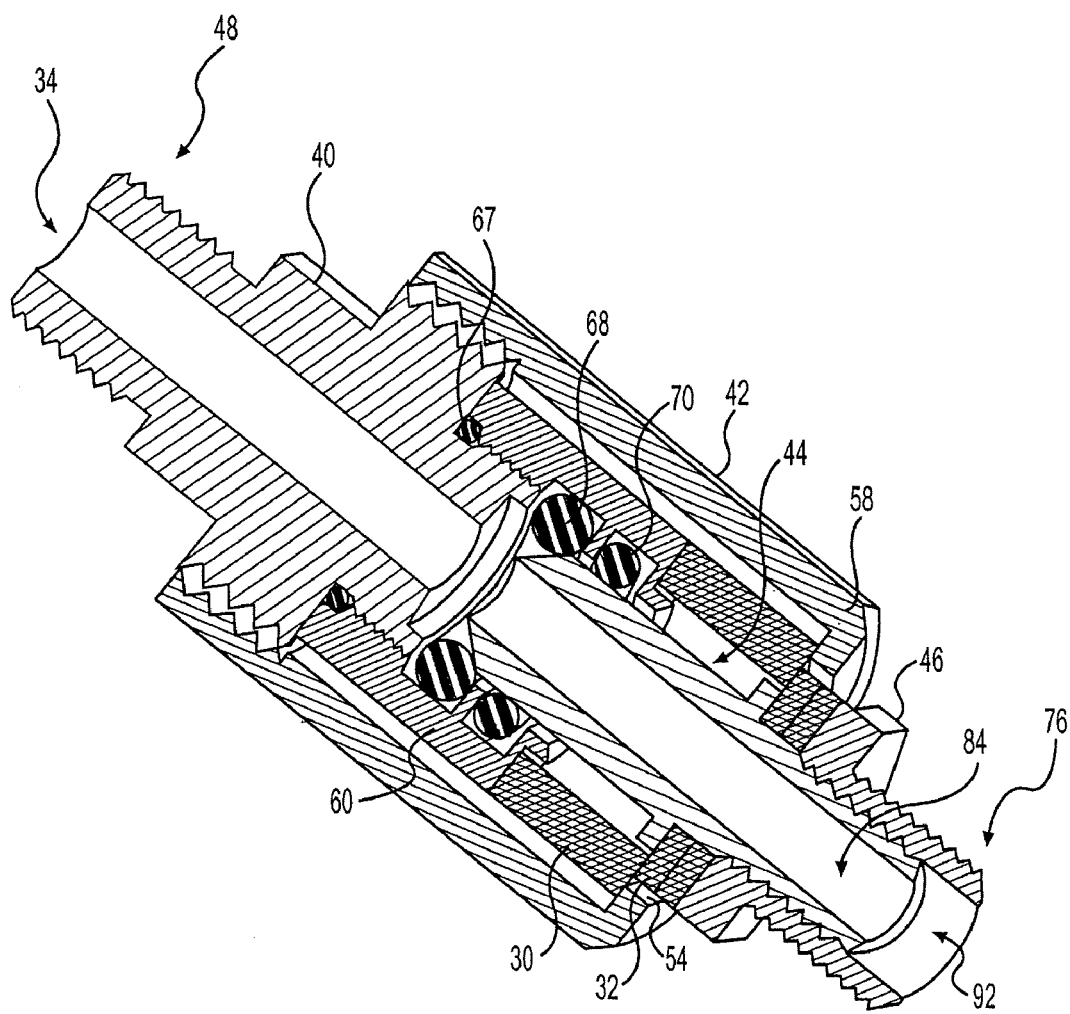
FIG. 4 is a cross sectional view similar to the view of FIG. 3 showing the fitting members interengaged with one another.

When the fitting members 22, 24 are in engaged relation, as shown in FIG. 4, the fitting members 22, 24 can be disengaged from one another by applying a force to the fitting members 22, 24 sufficient to overcome the magnetic attraction between the first and second magnetic coupling elements 30, 32. The first and second fitting members 22, 24 are moved apart from one another, such that they are separate from each other, and fluid communication between the first and second members 22, 24 and the first and second fluid chambers 26, 28 is broken.

Embodiments of a fitting constructed according to embodiments of the invention are useful in a wide range of applications and conditions. For example, fitting embodiments constructed according to embodiments of the invention (including fitting 20) can be used in situations in which it is desirable to quickly connect and disconnect a two or more fluid chambers in fluid communication with one another. An embodiment of a fitting according to the invention (including fitting 20) may also be used to protect sensitive electronic equipment from damage. For example, some equipment, some fluid handling structures and some fluids cannot withstand applied forces or cannot withstand applied forces that are over a predetermined magnitude. In the example embodiment disclosed below, the load limiting features of the fitting members are applied to a load cell. However, the load limiting features can be applied to any load sensitive structure, not just load cells. For example, this device could be attached to a piece of critically positioned structure where alignment is important, or to a thin structure which is sensitive to large loads. In these situations, if it is necessary to establish and/or terminate fluid communication therewith, fittings according to the invention could be constructed and used. It can be understood, therefore, that a wide range of fittings can be constructed according to embodiments of the invention which disengage when a force below a predetermined threshold force is applied. It can also be appreciated that fittings according to embodiments of the invention can be constructed in which the fitting members thereof disengage when a fluid pressure of a fluid (liquid or gas) passing therethrough exceeds a predetermined threshold pressure. For example, there could be an application where this device is placed in-line with a hose (a hose is attached to both ends of the device, instead of structure) and used as a breakaway device. In other words, if the tension in the hose exceeds a certain amount, the device would disconnect. It is to be understood that these are just some of the many examples in which a fitting constructed according to an embodiment of the invention may be used.

Figure 5:
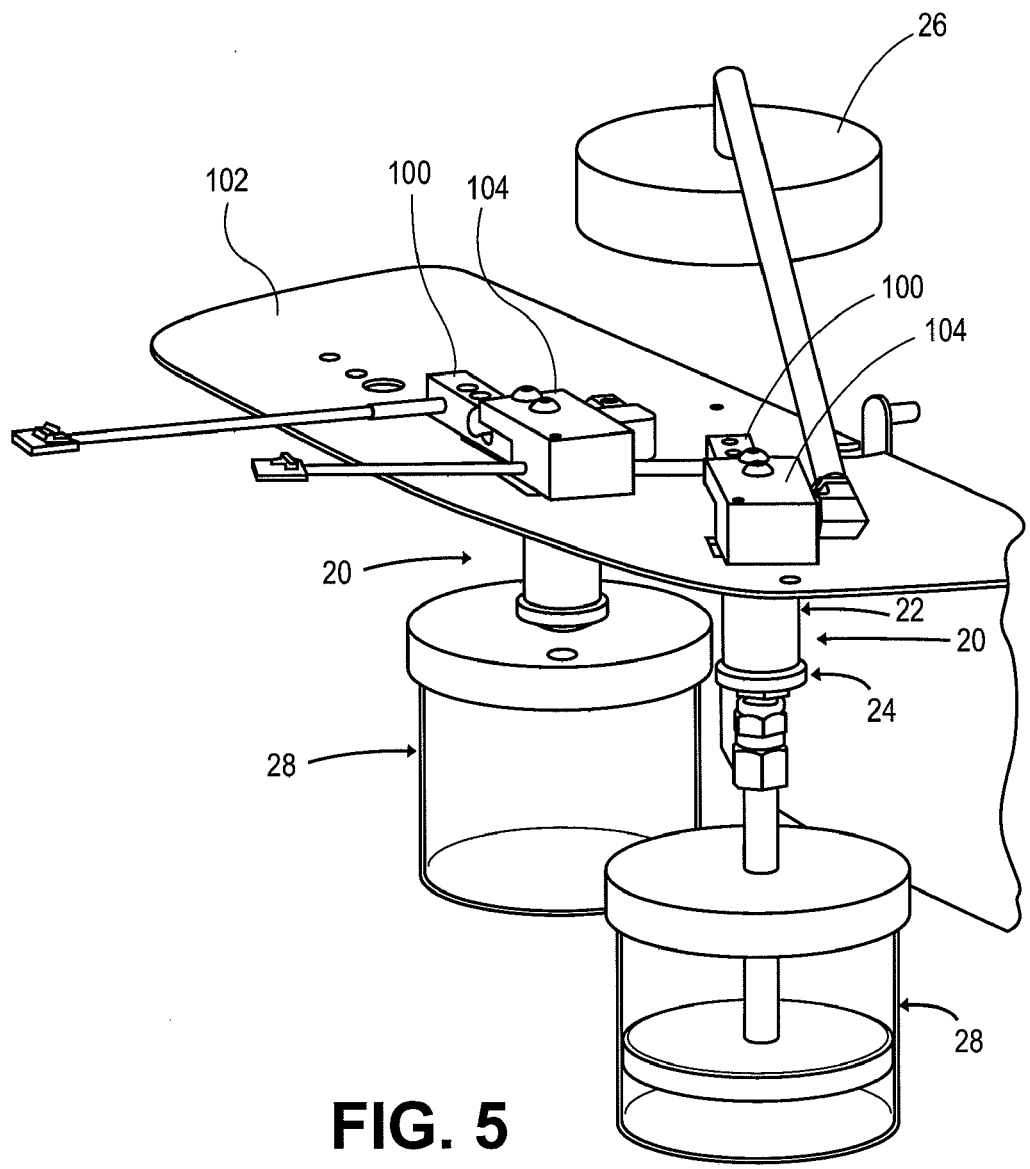
FIG. 5 is a perspective view of a portion of an air conditioning (hereafter, A/C) recovery cart including a load cell and showing two fluid conducting fittings connected to two fluid chambers, respectively.
Figure 6:
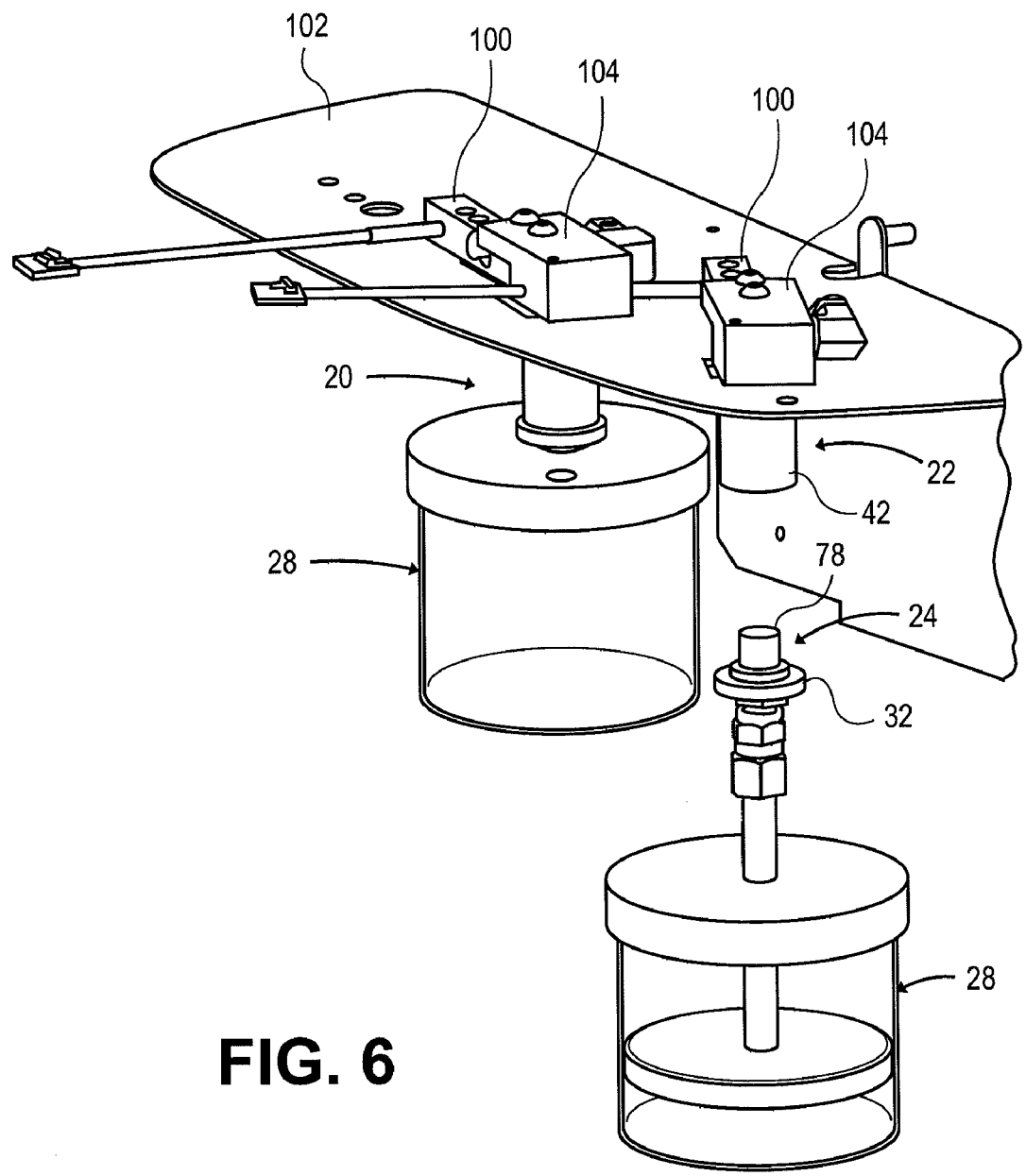
FIG. 6 is another perspective view of a portion of the A/C recovery cart shown in FIG. 5 showing first and second fitting members of the fitting in exploded relation to one another.
Figure 7:
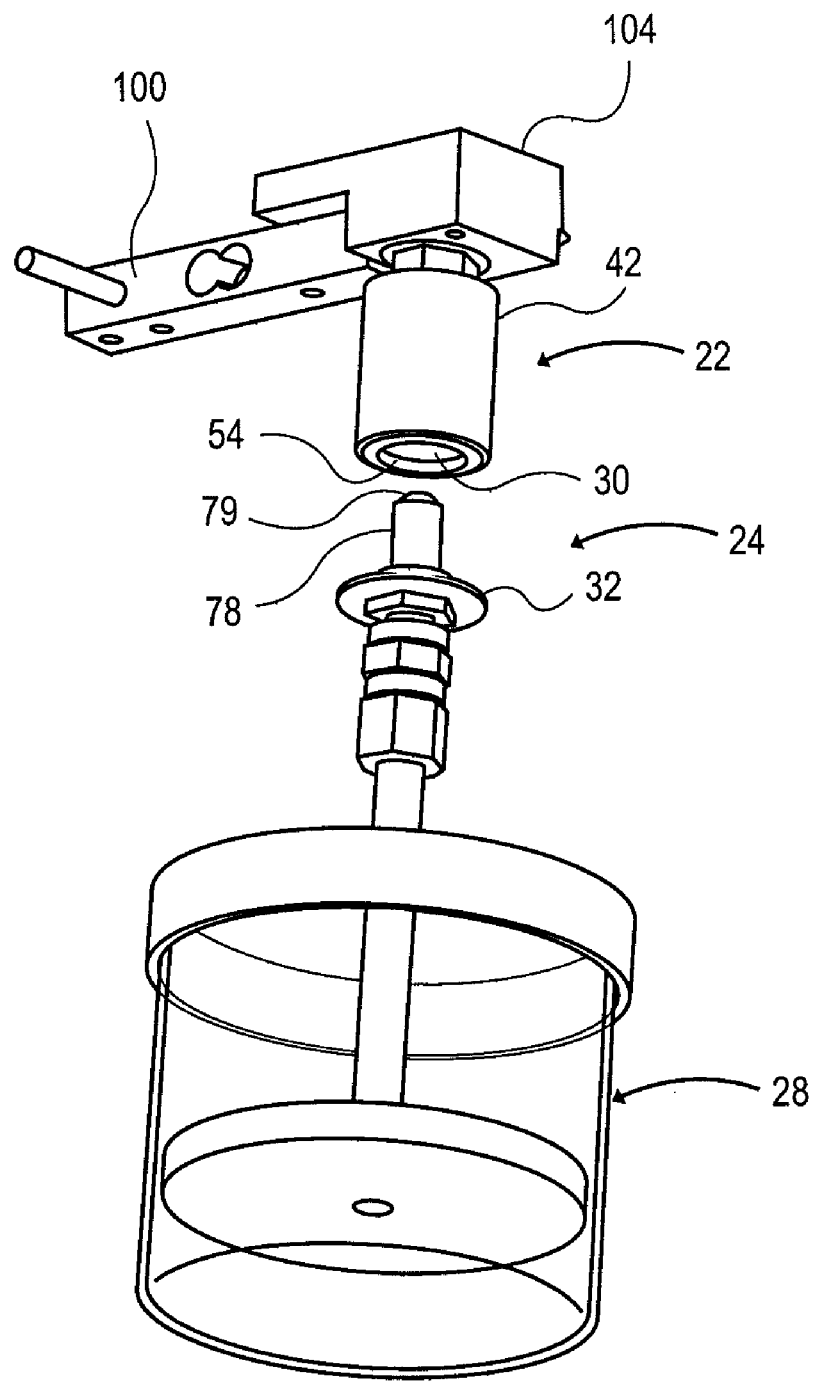
FIG. 7 is another perspective view of the fitting shown in FIG. 6 without the A/C recovery cart.

An instance in which the fitting 20 can be used is illustrated in FIGS. 5-7 which illustrates the servicing of an automotive vehicle air conditioning (or "A/C") system. Servicing an automotive vehicle A/C system typically involves evacuating refrigerant out of a refrigerant system, and then adding fresh refrigerant back into the refrigerant system, also known as recharging an A/C system. As the refrigerant is evacuated out, some amount of oil is also evacuated. The oil serves to lubricate the air conditioning system compressor. As the refrigerant is recovered, the oil, which circulates together along with the refrigerant, is also recovered. The oil needs to be separated from the refrigerant, and separately recovered into the drain reservoir. The same amount of oil recovered through this evacuation process is typically put back into the refrigerant system. The A/C needs enough oil to provide lubrication, but too much oil reduces the cooling capacity of the air conditioning system. In order to put the same amount of oil back in as was taken out, the amount of oil drained from the air conditioning system is measured.

One method of determining this amount is to measure the weight of the recovered oil with a load cell. Over time, as the drain reservoir is attached and detached repeatedly from the load cell, the load cell may be thrown out of calibration and damaged to the point of requiring replacement. A fitting 20, constructed according to embodiments of the invention would be useful in such a procedure.

In the example embodiment shown in FIG. 5, the first and second fitting members 22, 24 are shown in an engaged relation with one another. The first and second fitting members 22, 24 are constructed and arranged such that when the fitting members 22, 24 are mounted with respect to the load cell 100 mounted to a portion of an A/C recovery cart 102 and the fluid reservoir 28, respectively, movement of the fitting members 22, 24 into engaged relation establishes fluid communication between the first and second fluid chambers, and releasably couples the second fluid chamber to the load cell so that fluid in the second fluid chamber can be weighed by the load cell. It can be understood that in other embodiments, the fitting 20 may be mounted to thin non-load bearing sheet metal. The fluid chamber 26 is the refrigerant chamber in the A/C system of the automotive vehicle, and the second fluid chamber 28 is an oil drain bottle or fresh oil reservoir. In the embodiment shown in FIG. 5, two oil reservoirs are shown, one is an oil drain and the other is a container of fresh oil. The threaded portion 36 (not shown) of the first fitting member 22 is mounted with respect to the load cell 100 via aluminum block 104, which is configured to allow fluid flow between the first fitting member 22 and the first fluid chamber 26, via flexible hoses, metal tubing or other fluid transfer devices, and the threaded portion 90 (not shown) of the second fitting member connects to the second fluid chamber, 28, via flexible hoses, metal tubing or other fluid transfer devices to allow fluid flow between the second fitting member 24 and the second fluid chamber 28.

FIGS. 6 and 7 show the first and second fitting members 22, 24 in disengaged relation to one another. The first and second fitting members 22, 24 are constructed and arranged such that as force is applied to the first and second fitting members 22, 24 sufficient to overcome the magnetic attraction of the first and second magnetic coupling elements 30, 32, the first and second members are disengaged from one another. The first and second fitting members 22, 24 are further constructed and arranged such that the force required to move the fitting members 22, 24 apart is less than the load limit of the load cell 100, thereby protecting the load cell from being damaged.

The fitting 20, constructed in accordance with embodiments of the invention, also permits quick connect and quick disconnect of the oil drain or oil reservoir 28. The quick connect and quick disconnect aspect reduces the amount of time required to service the A/C system, thereby saving overall repair costs.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fitting assembly which allows a first fluid chamber to be connected with a second fluid chamber and which allows the first fluid chamber to be disconnected from the second fluid chamber, said fitting assembly comprising:

a first fitting for mounting in fluid communication with the first fluid chamber, said first fitting including a base structure, a first magnetic coupling element, and a cap structure directly coupled to the base structure, wherein the cap structure has a radially inward extending flange approximate an end of said cap structure that provides an annular surface that directly seats the first magnetic coupling element thereon, the engagement of the first magnetic coupling element and flange forming a recess; and a second fitting for mounting in fluid communication with the second fluid chamber, said second fitting including a second magnetic coupling element;

wherein when said first and second fittings are engaged with one another, the second magnetic coupling element is disposed within the recess such that the first magnetic coupling element contacts the second magnetic coupling element, and a magnetic attraction between said first and second magnetic coupling elements holds both said first and second fittings in engagement to establish fluid communication between the first fluid chamber and the second fluid chamber;

wherein a force required to separate said engaged first and second fittings is limited to the force required to overcome the magnetic attraction between said first and second fittings;

wherein said first and second fittings are each configured with a through passage, such that when said first and second fittings are engaged with one another, the through passage of the first fitting aligns with the through passage of the second fitting to establish fluid communication between the first fitting and the second fitting;

wherein the fitting assembly is configured to provide a substantially straight flow path from the first fluid chamber to the second fluid chamber when the first and second fittings are attached together;

wherein the second fitting further comprises a tip portion, such that when said first and second fittings are engaged with one another, said tip portion of said second fitting is disposed within said cap structure of said first fitting;

wherein said first fitting further includes a sealing structure directly coupled to the base structure, the sealing structure configured and arranged such that when said first and second fittings are engaged said sealing structure provides a sealed interface between said first and second fittings; and wherein said first magnetic coupling element is located between said sealing structure and said flange.

2. The fitting assembly according to claim 1, further comprising a load cell, wherein said first fitting is coupled to the load cell, and wherein the force required to move said first and second fittings apart is less than a limit load of the load cell.

3. The fitting assembly according to claim 1, wherein one of the first and second magnetic coupling elements comprises a permanent magnet, and wherein the other one of the first and second magnetic coupling element comprises a magnetic attracting component.

4. The fitting assembly according to claim 1, wherein the sealing structure comprises a series of elastomeric rings.

5. The fitting according to claim 1, wherein the second fitting further comprises a body structure and a body holding structure, and wherein the body structure is an integral structure shaped to form said tip portion.

6. The fitting assembly according to claim 1, wherein said sealing structure further comprises a housing disposed within the cap structure, said housing being configured with a groove; and a sealing element arranged in the groove, such that when said first and second fittings are engaged, said sealing structure provides a sealed interface between said first and second fittings.

7. The fitting assembly according to claim 1, further comprising a load sensitive structure, wherein said first fitting is coupled to the load sensitive structure, and wherein the force required to move said first and second fittings apart is less than a limit load of the load sensitive structure.

8. The fitting assembly according to claim 1, wherein the first and second fittings are constructed and arranged to breakaway from each other when a fluid pressure of a fluid passing therethrough exceeds a predetermined threshold pressure.

9. A load limiting fitting configured to releasably couple a first fluid chamber with a second fluid chamber, said load limiting fitting comprising:

a first fitting member configured to be coupled to a load cell and in fluid communication with the first fluid chamber, said first fitting member including a base structure, a first magnetic coupling element, and a cap structure coupled to the base, wherein the cap structure has a radially inward extending flange approximate an end of said cap structure that provides an annular surface for directly seating the first magnetic coupling element thereon, the engagement of the first magnetic coupling element and flange forming a recess;

a second fitting member configured to be mounted in fluid communication with the second fluid chamber, said second fitting member including a second magnetic coupling element;

wherein when said first and second fitting members are engaged with one another, the second magnetic coupling element is disposed within the recess such that the first magnetic coupling element contacts the second magnetic coupling element, and a magnetic attraction between said first and second magnetic coupling elements holds said first and second fitting members in engagement;

wherein when a force is applied to said engaged first and second fitting members sufficient to overcome the magnetic attraction, said first and second fitting members move apart, the force required being less than a threshold amount;

wherein the movement of both said fitting members into engaged relation when the fitting is attached to the load cell and the second fluid chamber establishes fluid communication between the first fluid chamber and the second fluid chamber and releasably couples the second fluid chamber to the load cell so that fluid in the second fluid chamber can be weighed by the load cell;

wherein said first and second fitting members are each configured with a through passage, such that when said first and second fitting members are engaged with one another, the through passage of the first fitting member aligns with the through passage of the second fitting member to establish fluid communication between the first fitting member and the second fitting member;

wherein the fitting is configured to provide a substantially straight flow path from the first fluid chamber to the second fluid chamber when the first and second fitting means are attached together and the fitting is in communication with the load cell and the second fluid chamber;

wherein said first fitting member further includes a sealing structure directly coupled to said base structure, said sealing structure configured and arranged such that when said first and second fitting members are engaged said sealing structure provides a sealed interface between said first and second fitting members;

wherein the second fitting member further comprises a tip portion, such that when said first and second fitting members are engaged with one another, said tip portion of said second fitting member is disposed within said cap structure of said first fitting member; and wherein said first magnetic coupling element is located between said sealing structure and said flange.

10. The load limiting fitting according to claim 9, wherein one of the first and second magnetic coupling elements comprises a permanent magnet, and wherein the other one of the first and second magnetic coupling element comprises a magnetic attracting component.

11. The load limiting fitting according to claim 9, wherein the sealing structure comprises a series of elastomeric rings.

12. The load limiting fitting according to claim 9, wherein the second fitting member further comprises a body structure and a body holding structure, and wherein the body structure is an integral structure shaped to form said tip portion.

13. The load limiting fitting according to claim 12, wherein said sealing structure further comprises a housing disposed within the cap structure, said housing being configured with a groove; and a sealing element arranged in the groove, such that when said first and second fitting members are engaged, said sealing structure provides a sealed interface between said first and second fitting members.

14. A method for coupling and decoupling a fluid reservoir on a load cell in a manner which limits the load transferred to the load cell, comprising:

providing the first fitting of claim 1 mounted in fluid communication with a fluid chamber;

providing the second fitting of claim 1 mounted in fluid communication with a fluid reservoir;

engaging the first and second fittings with one another to establish fluid communication between the fluid chamber and the fluid reservoir, and holding the first and second fittings in engaged relation with one another with the magnetic force of attraction between the first and second magnetic coupling elements;

separating the first and second fittings so that the fluid chamber and the fluid reservoir are no longer in fluid communication.

15. The method according to claim 14, wherein said separating further comprises applying a force to the first and second fittings that is limited to the force required to overcome the magnetic attraction between the first and second fitting members.

* * * * *